UNITED STATES PATENT OFFICE.

JOHN C. KESSLER, OF MILWAUKEE, WISCONSIN, ASSIGNOR OF THREE-FOURTHS TO CHRISTIAN WAHL AND WILLIAM PRIESTER, OF SAME PLACE.

PROCESS OF EXTRACTING GOLD AND SILVER FROM ORES.

SPECIFICATION forming part of Letters Patent No. 665,105, dated January 1, 1901.

Application filed July 23, 1898. Serial No. 686,712. (No specimens.)

*To all whom it may concern:*

Be it known that I, JOHN C. KESSLER, a citizen of the United States, residing at Milwaukee, in the county of Milwaukee and State of Wisconsin, have invented new and useful Improvements in Processes of Extracting Gold and Silver from their Ores, of which the following is a specification.

My invention relates to improvements in processes of extracting gold and silver from their ores by bringing them in contact with soluble cyanid and soluble yellow prussiate of potassium or other analogous yellow prussiates, the energizing and reënergizing of said solution by permanganate of potassium, and the separation of the precious metals from the cyanid solution.

The object of my invention is to provide a process by which the extraction of gold and silver from their ores may be greatly accelerated and the more expensive ingredients forming the solution for the purpose of extracting the precious metals regenerated and reënergized for reuse, whereby the expense of extraction and reduction is proportionately diminished.

The ore, having been crushed or pulverized in the usual manner, is subjected to the action of an aqueous solution containing cyanid of potassium or other cyanids, yellow prussiate of potassium, and permanganate of potassium, or sodium, which several ingredients are employed in substantially the following proportions, to wit: water, one thousand (1,000) parts; yellow prussiate of potassium, two and one-half (2.5) parts; cyanid of potassium, two and one-half (2.5) parts; permanganate of potassium, one-tenth (0.1) part.

The solution is prepared substantially as follows: The above quantity of yellow prussiate of potassium is first dissolved in about eight hundred to nine hundred parts of water, while the above-mentioned quantity of permanganate of potassium is also dissolved in the remaining one hundred to two hundred parts of water. When the last two mentioned solutions are united and mixed, then the above-named proportion of cyanid of potassium is added, and the solution as a whole is thoroughly mixed, when it is ready for use.

A small turbid sediment of oxid of manganese is formed, which in itself is an additional oxidizing agent, adding to the dissolving power of the solution.

By the action of the permanganate of potassium on the yellow prussiate of potassium the transformation of the latter into red prussiate of potassium is effected, the reaction of these two salts taking place according to the following formula:

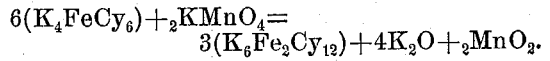

While the cyanid of potassium remains intact it serves in the course of the process as the dissolving agent for the formed cyanid of gold and the cyanid of silver. The red prussiate of potassium readily yields a fraction of its cyanogen to gold and silver much more readily than cyanid of potassium alone will do. The cyanid of gold and the cyanid of silver thus obtained are dissolved by the cyanid of potassium in the solution, while at the same time the red prussiate of potassium is retransmutated into yellow prussiate of potassium. By adding new permanganate of potassium the yellow prussiate of potassium is again transformed into the more effective red prussiate of potassium. When all the ingredients have been thus united, the solution formed thereby is applied to the crushed ore in any suitable manner for such a length of time as may be required to insure the complete dissolution of the gold and silver contained in the ores.

When the solution is saturated and will not act on or absorb any more of the precious metals contained in the ores, it is drawn off into a separate receptacle for precipitation of the metals, which precipitation is accomplished in the manner hereinafter described.

For the precipitation of the precious metals from the cyanid solution sodium amalgam has heretofore been used, but in employing sodium amalgam as a precipitating agent a higher percentage of sodium is used up than the precipitation of the precious metals theoretically requires, for the reason that the decomposition of the water is brought about at the expense of sodium. By my method this loss of sodium is avoided, and the gold and silver are precipitated from their cyanid solution more readily and economically by changing the easily-soluble cyanid solution into a more unsoluble cyanid compound, thus removing the dissolving agent of cyanid of silver or of cyanid of gold, whereby these metals are separated from their solution as cyanids. To accomplish this end, any soluble lead salt—for example, acetate of lead, nitrate of lead, chlorid of lead, &c.—which forms with cyanid a non-soluble compound may be employed.

When mixing a solution containing cyanid of gold and cyanid of silver which has been obtained through the action of cyanid of potassium with a lead salt dissolved in water, the cyanid of potassium will be decomposed, and gold, silver, and lead are precipitated as cyanids. The liquid covering this sediment contains only the alkali salt of that acid which in the beginning formed an ingredient of the lead salt used. By employing nitrate of lead, for instance, the following formula illustrates the reactions taking place:

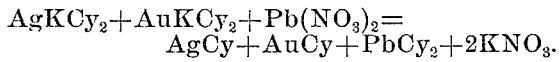
$$AgKCy_2 + AuKCy_2 + Pb(NO_3)_2 = AgCy + AuCy + PbCy_2 + 2KNO_3.$$

Now should the solution, as in the above-mentioned case, also contain ferrocyanid of potassium (yellow prussiate of potassium) then that salt will also be decomposed by the lead salt used, as per formula:

$$K_4FeCy_6 + 2Pb(NO_3)_2 = Pb_2FeCy_6 + 4KNO_3.$$

The sediments produced by the addition of a lead salt—namely:

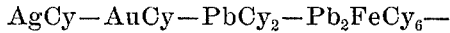
$$AgCy - AuCy - PbCy_2 - Pb_2FeCy_6 -$$

are neither soluble in water, nor in the weak solution of nitrate of potassium just formed. They readily and completely precipitate and form a heavy deposit which can be easily filtered. The liquid covering the deposit thus obtained contains neither gold nor silver. It consists simply of a diluted solution of nitrate of potassium, which is of no value whatever. The deposit composed of the above-mentioned cyanid and ferrocyanid metals is not to be considered as a mixture only, for in reality cyanid of gold and cyanid of silver form, with cyanid of lead, a compound whose insolubility facilitates the complete precipitation of gold and silver. The clear liquid above the deposit is then discharged, and the deposit or settlings are filtered in order to free them from water as much as possible. After mixing this filtered sediment thoroughly with sodium amalgam an amalgam will be the result which contains gold, silver, and lead, leaving a concentrated solution of cyanid of sodium and ferrocyanid of sodium, which, after adding the necessary quantity of water and of permanganate of potassium, can be again and repeatedly used. The mercury is distilled from the amalgam in the usual manner, when the gold, silver, and lead remaining are treated with the result of fine gold and silver after cupellation.

In using the solution as above described a portion of its energy as a dissolvent will be lost. This dissolving power will be regenerated and the solution restored to its original strength by the addition of a small quantity (about the same as originally used) of permanganate of potassium. When thus freshly energized, the solution can be used over and over again for the same purpose, involving the small loss only of permanganate of potassium, which, being comparatively inexpensive, reduces the cost of extracting the metals, and, aside from the slight loss of handling, the foregoing process not only does not involve any loss of cyanid, but, on the contrary, a certain additional quantity of alkali cyanid is produced by the action of the sodium amalgam on the ferrocyanid of lead.

The above proportions of the several ingredients are preferably employed in carrying out my process; but a slight deviation from such proportions is not material to the result and may be made without departing from the essence and spirit of my invention.

Having thus described my invention, what I claim as new, and desire to secure by Letters Patent, is—

1. The process herein described, of separating precious metals from auriferous and argentiferous ores, consisting, first in subjecting the ores to the action of a solution consisting of water, yellow prussiate of potassium, cyanid of potassium, and permanganate of potassium, until the gold and silver contained in such ores are dissolved; second, in separating the metals from their solution by the application of a soluble lead salt, by which the cyanid of alkali metal contained in solution is decomposed and a non-soluble cyanid of lead is formed, which is precipitated together with the cyanid of gold and cyanid of silver, all substantially as and for the purpose specified.

2. The process herein described of separating precious metals from auriferous and argentiferous ores, consisting, first, in subjecting the ores to the action of an aqueous solution consisting of cyanid of an alkali metal, yellow prussiate of potassium and permanganate of an alkali metal, in substantially the proportion of water, one thousand (1,000) parts; yellow prussiate of potassium, two and one-half (2.5) parts; cyanid of potassium, two and one-half (2.5) parts; permanganate of potassium, one-tenth (0.1) part until the gold and silver contained in such ores, are dissolved; second, separating the metals from their solution by the application of a soluble lead salt (nitrate of lead, acetate of lead, or chlorid of lead) by which the cyanid of alkali metal, contained in solution, is decomposed and a non-soluble cyanid of lead is formed, the cyanid of alkali metal thus decomposed cannot act any more as a solvent for the cyanid of gold or silver and consequently these metals will be precipitated as cyanids together with the cyanid of lead.

3. The process herein described of separating precious metals from auriferous and argentiferous ores, consisting, first, in subjecting the ores to the action of an aqueous solution, consisting of cyanid of an alkali metal, yellow prussiate of potassium and a permanganate of an alkali metal, substantially in the proportions of water, one thousand (1,000) parts; yellow prussiate of potassium, two and one-half (2.5) parts; cyanid of potassium, two and one-half (2.5) parts; permanganate of potassium, one-tenth (0.1) part until the gold and silver contained in such ores are dissolved; second, separating the metals from their solution, by the application of a soluble lead salt, by which the cyanid solution is decomposed and a non-soluble cyanid of lead is formed, at the same time a cyanid of gold and silver is precipitated; third, by the application to the sediment thus precipitated of sodium amalgam, whereby a gold, silver and lead amalgam is produced, at the same time a concentrated solution of cyanid of potassium and ferrocyanid of sodium is regenerated, substantially as and for the purpose specified.

4. The process herein described of separating precious metals from auriferous and argentiferous ores, consisting, first, in subjecting the ores to the action of an aqueous solution, consisting of cyanid of alkali metal, yellow prussiate of potassium and permanganate of an alkali metal in substantially the proportions of water, one thousand (1,000) parts; yellow prussiate of potassium, two and one-half (2.5) parts; cyanid of alkali, two and one-half (2.5) parts; permanganate of potassium, one-tenth (0.1) part until the gold and silver contained in such ores are dissolved; second, separating the metals from their solution by the application of a soluble lead salt, by which the cyanid solution is decomposed and a non-soluble cyanid of lead is formed, at the same time a non-soluble cyanid of gold or silver is precipitated; third, by the application, to the sediment thus precipitated, of sodium amalgam, whereby a gold, silver and lead amalgam is produced and at the same time a concentrated solution of cyanid and ferrocyanid of sodium is regenerated; and fourth, diluting the concentrated cyanid solution with a quantity of water and regenerating and re-energizing the aqueous solution for reuse by the addition of permanganate of alkali, substantially as and for the purpose specified.

In witness whereof I affix my signature in the presence of two witnesses.

JOHN C. KESSLER.

Witnesses:
JAS. B. ERWIN,
CHRISTIAN WAHL.